July 29, 1952 C. C. CUTLER 2,605,361

DIFFERENTIAL QUANTIZATION OF COMMUNICATION SIGNALS

Filed June 29, 1950 3 Sheets-Sheet 1

INVENTOR
C. C. CUTLER
BY Hugh S. Wertz
ATTORNEY

July 29, 1952 C. C. CUTLER 2,605,361

DIFFERENTIAL QUANTIZATION OF COMMUNICATION SIGNALS

Filed June 29, 1950 3 Sheets-Sheet 2

INVENTOR
C. C. CUTLER
BY
Hugh S. Wertz
ATTORNEY

DIFFERENTIAL QUANTIZATION OF COMMUNICATION SIGNALS

Filed June 29, 1950 3 Sheets-Sheet 3

INVENTOR
C. C. CUTLER
BY Hugh S. Wertz
ATTORNEY

Patented July 29, 1952

2,605,361

UNITED STATES PATENT OFFICE 2,605,361

DIFFERENTIAL QUANTIZATION OF COMMUNICATION SIGNALS

Cassius C. Cutler, Gillette, N. J., assignor to Bell Telephone Laboratories, Incorporated, New York, N. Y., a corporation of New York Application June 29, 1950, Serial No. 171,218

6 Claims. (Cl. 179—15.6)

This invention relates to wide band transmission systems and, more particularly, to improvements in quantized signal transmission systems.

Although correlations of one sort or another exist in substantially all communication signals (for example, speech, music, or television), the typical present-day communication system employs sufficient channel capacity to transmit completely random, uncorrelated signals. Manifestly, considerable increases in transmission efficiency are possible by taking advantage of one or more of these correlations, which may be semantic, spatial (in television, for example), chronologic, etc.

It is the object of the present invention to improve the efficiency of communication systems by taking advantage of correlation in the signals of these systems.

The present invention is primarily applicable to communications systems involving quantization of the signal (i. e. the representation of each signal sample, which may have any amplitude in a continuous range, by the nearest one of a fixed number of discrete values). In accordance with the practice of the invention, the efficiency of transmission of such quantized signals is enhanced by transmitting the changes in level rather than the levels themselves. At the receiver, each of the received level changes is then added to the immediately preceding level so as to synthesize the original signal. Two obvious arrangements suggest themselves for such a scheme. First, it is possible to quantize each of two successive signal samples separately and then transmit a difference of the two quantized values obtained. Second, it is possible to derive the difference of two successive signal samples and then transmit the quantized value of this difference. The invention, however, is characterized by a third, less obvious, arrangement which is essentially a hybrid combination of the two just described and possesses advantages thereover in automatically compensating for errors of quantization. In each embodiment of the present invention, the signal transmitted is dependent on a quantization of a difference between a quantized and an unquantized signal.

In the simplest embodiment of the invention, the first sample transmitted is the quantized value of the first sample of the input signal.

The second sample transmitted is the quantized difference of the second sample of the input signal and the quantized sample previously transmitted. The next sample transmitted is the quantized difference of the next sample of the input signal and the algebraic sum of the two quantized samples previously transmitted. Similarly each succeeding sample transmitted is the quantized difference of the corresponding instant sample of the input signal and a signal derived by the integration of all the samples previously transmitted. It will be convenient henceforth to use the term "differential" to represent the difference of an instant sample of the input signal and a signal derived from an integration of the previously transmitted quantized signals. It is a characteristic of differential type systems in accordance with the invention that errors of quantization are not cumulative since a quantization error made on one sample is subtracted from the next sample and thereby tends to be corrected in the next quantization so that there is effectively no cumulative error.

As indicated above, a communication system which operates in accordance with the practice of the invention takes advantage of the fact that most signals to be transmitted by present means do not utilize the full capacity of a communication channel. The higher frequencies which a system may be capable of transmitting are not usually sent with the maximum amplitude of which the system is capable nor, in fact, does the recipient require the same fidelity of transmission of the higher frequencies that he does of the lower. It is also to be noted that if each signal consists primarily of frequencies much lower than the maximum frequency of a communication channel, adjacent direct quantum samples of the signal will be of nearly the same amplitude. It is thus evident that in this case there is an economy in transmitting only the differences rather than the direct amplitude of the signal.

This economy may be used to increase the fidelity of a time division multiplex system with a given number of channels, resulting in reduced distortion and an improved signal-to-quantizing noise level. On the other hand, it may be used to reduce the number of levels (or code characters) necessary to transmit a signal with a given fidelity.

The required amplitude capacity of the differential system of the invention is determined not by amplitude, as in the present-day systems, but by the signal slope. Thus, it is apparent that an impulse or a step signal of amplitude larger than the total number of quantum steps could not be sent without error. Most communication systems, however, do not involve such signals, or else the signals can stand a fair amount of degradation of the type that the system of the invention gives. A miss in quantizing such a signal is normally corrected in the succeeding samples so that there is only instantaneous damage to the signal.

It is also in accordance with the invention to perform more than one such differentiation upon a signal, and further transmission efficiencies are effected by such means. Further advantages also accrue from systems in which the value of the quantum is automatically controlled to suit the nature of the signal, as is described in my copending application, filed June 29, 1950, Serial No. 171,219.

The invention will be more fully understood from the following detailed description of certain illustrative embodiments thereof, taken in connection with the appended drawings forming a part thereof, in which.

Figure 1:
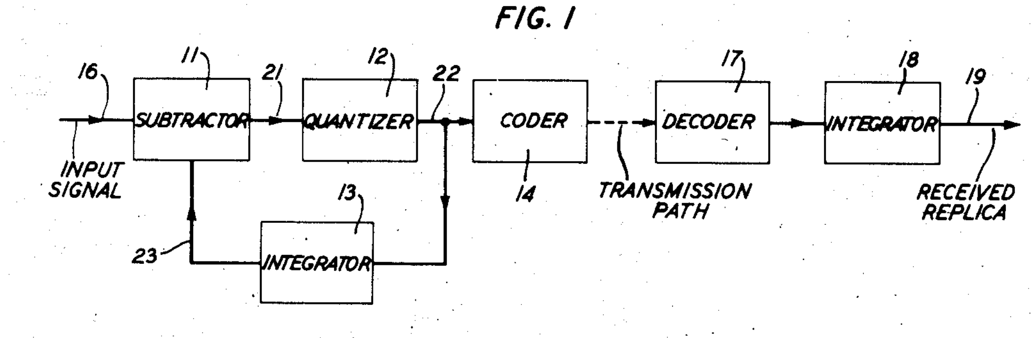
Fig. 1 illustrates a simple illustrative embodiment of a transmission system employing differential quantization.
Figure 2A:
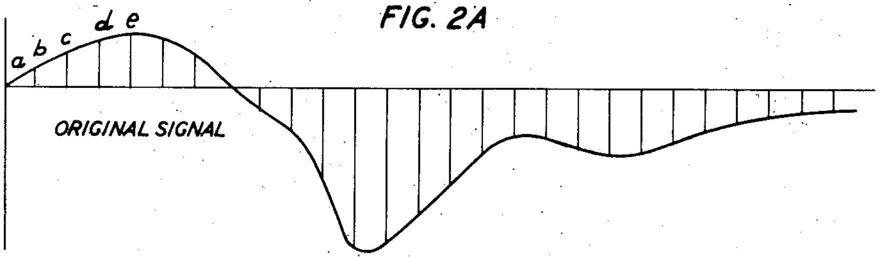
Fig. 2 shows a sample set of signal wave patterns which are found at certain points in the system of Fig. 1.
Figure 2B:
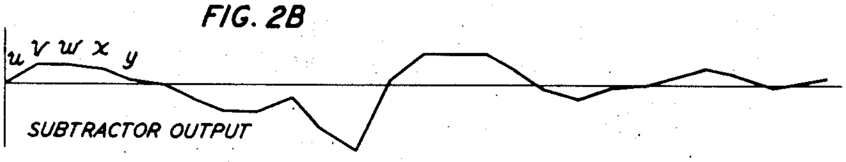
Figure 2C:
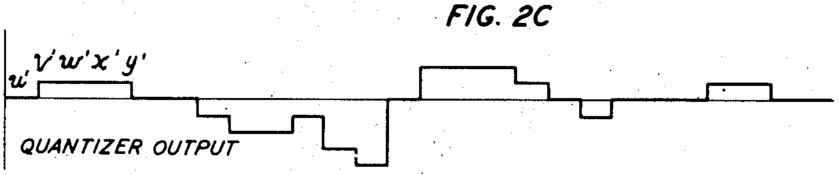
Figure 2D:
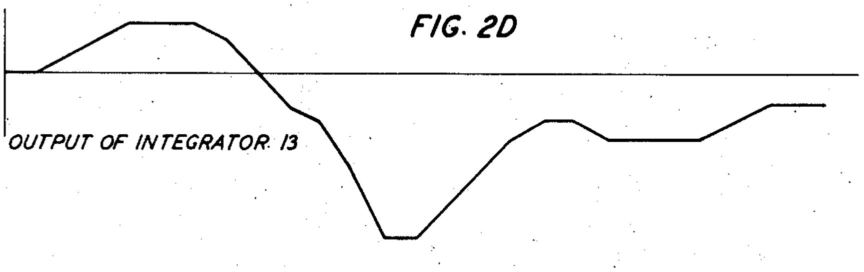

In Fig. 1, there is shown a block diagram of a simple illustrative arrangement of the invention which effectuates differential quantization of a signal. The input signal 16 at the transmitting station is first admitted to a subtractor 11, where it is combined with the output of the integrator 13. The output 21 of the subtractor is applied to a sampler and quantizer 12, which resolves the signal to the nearest discrete quantum amplitudes for regular sampling periods. The quantized signal 22 is then transmitted to the integrator 13, the output circuit 23 of which is connected back to the subtractor 11. That the foregoing operations result in a differentially quantized signal from the quantizer can readily be seen by referring to the wave forms shown in Fig. 2. For purposes of illustration, consider a signal having successive amplitudes $a, b, c, d, e$, etc., at the respective sampling times, as indicated in Fig. 2A. Let it now be assumed that the output of the subtractor 11 comprises successive amplitudes $u, v, w, x, y$, etc., at the corresponding times, as shown in Fig. 2B. Of necessity, the quantizer 12 produces corresponding amplitudes $u', v', w', x', y'$ (as shown in Fig. 2C), which, in the integrator 13, become values proportional to $u'$, $u'+v'$, $u'+v'+w'$, etc., as drawn in Fig. 2D. Still referring to the example chosen, it is a simple matter to relate the values of $a, b, c$, etc., to $u, v, w$, etc. Thus, if the circuit is assumed to be quiescent prior to $a$, it is evident that the output 21 of the subtractor is given by:

$$a-0=u;\ b-u'=v;\ c-(u'+v')=w;$$
$$d-(u'+v'+w')=x;\ e-(u'+v'+w'+x')=y$$

It follows, therefore, that:

$$u=a\cong u';\ v\cong b-a\cong v';\ w\cong c-b\cong w';$$
$$x\cong d-c\cong x';\ y\cong e-d\cong y'$$

It is evident, therefore, that except for the uncertainty due to the quantizing error, the quantizer output 22 is indeed the differential of the input signal 16.

The quantizer output 22 is then the quantized differential of the input signal 16. Each output sample represents the quantized difference of the instant value of the input signal and the signal derived by integration of the previously transmitted output samples. It can be seen that in this case the signal derived by integration represents essentially the quantized value of the sample immediately preceding the corresponding instant input sample.

It is also in accordance with the invention, although not necessary thereto, that the quantizer output 22 be coded for transmission. In the illustrative embodiment shown in Fig. 1, the output 22 of quantizer 12 is coded in a coder 14, and a coded signal 24 is transmitted to the receiving station, where it is decoded in decoder 17, after which the decoder output 26 is simply passed through an integrating circuit 18 to reproduce a replica 19 of the original signal. The coding and decoding operations can, in accordance with the invention, be performed by any of those means which are well known in the art for performing such functions, and this is, of course, also true of the subtractor, integrator, and quantizer circuits which are employed in the practice of the invention.

Figure 3:
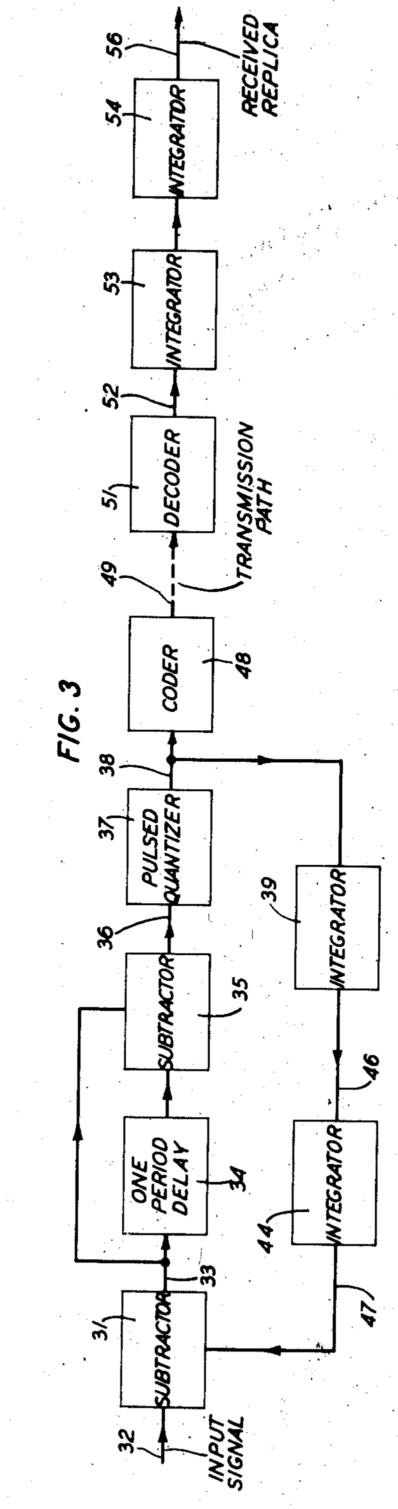
Fig. 3 is a schematic block diagram of an exemplary arrangement of a double differential quantization system.

It is within the scope of the invention to extend the above-described system into multiple differentiation systems. Basically, additional differentiation to any deree may be had by adding more differentiating circuits similar to the ones already described and which fundamentally take the differences between the adjacent samples either before or after quantization. In Fig. 3, there is shown a block diagram of a simple illustrative arrangement which provides double differential quantization of an input signal. The operation of this arrangement can be best visualized by considering an input signal 32 to the subtractor 31. Assume that this input signal 32 has successive amplitudes $a, b, c, d, e$, etc., at the respective sampling times, and further assume that the output 33 of the subtractor 31 has successive amplitudes $u, v, w, x, y$, etc., at the corresponding times. A portion of the signal 33 is delayed by a delaying means 34 and is then subtracted in subtractor 35 from the remainder of the signal 33 which is undelayed. In accordance with the embodiment of the invention now being described, the amount of delay caused by delaying means 34 is equal to one sampling time. It is thus obvious that the output 36 of the subtractor is a signal which can be represented by $u-t$, $v-u$, $w-v$, $x-w$, $y-x$, etc., at the sampling times in question. For simplicity of exposition, let it be assumed that the output of the subtractor 31 is equal to zero at the time corresponding to $t$ (i. e., before the time corresponding to $u$), so that signal 36 can be represented by simply $u$, $v-u$, $w-v$, $x-w$, $y-x$, etc. The difference signal 36 is then operated on by a pulsed quantizer and sampler 37 so as to yield a signal 38 which consists of a series of pulses having amplitudes (at the corresponding sampling times) equal to $u'$, $(v-u)'$, $(w-v)'$, $(x-w)'$, and $(y-x)'$.

Figure 4A:
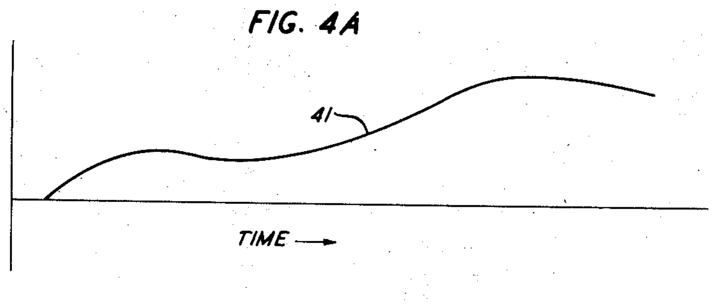
Fig. 4 shows certain wave forms of interest in connection with the system of Fig. 3.
Figure 4B:
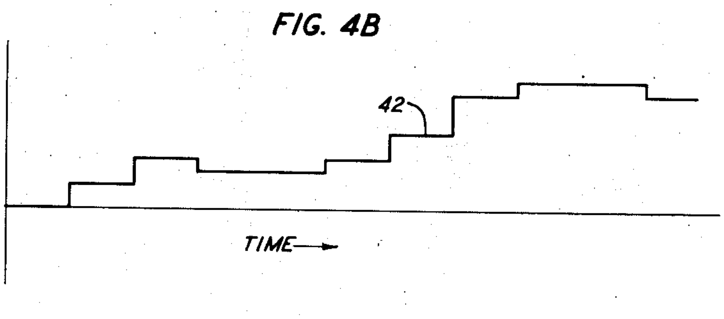
Figure 4C:
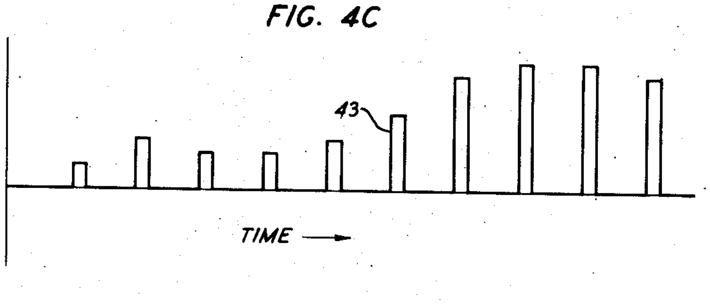

A pulsed quantizer and sampler is a quantizer in which the output comes out as a series of pulses rather than a series of steps. In accordance with the invention, this can be accomplished in quantizer 37 by modulating the signal with a regulated series of pulses at the sampling rate either before or after quantizing. The output of such a quantizer in relation to a normal quantized signal is illustrated in Fig. 4. Wave form 41, shown in Fig. 4A, depicts a continuous input signal as a function of time; wave form 42, shown in Fig. 4B, shows a step quantized signal representing the output of a sampler and quantizer to which an input such as signal 41 has been applied; and Fig. 4C illustrates the series of pulses 43 which comprise the output of a pulsed quantizer and sampler to which has been applied a signal such as that of wave form 41. The differences between the signals 42 and 43 are apparent from the drawing.

Returning now to the description of the system of Fig. 3, signal 38 from quantizer 37 is fed to a first integrator circuit 39 whose output 46 is a stepped signal having successive amplitudes of $u'$, $$u'+(v-u)',\ u'+(v-u)'+(w-v)'$$
$$u'+(v-u)'+(w-v)'+(x-w)'$$
$$u'+(v-u)'+(w-v)'+(x-w)'+(y-x)'$$

etc. It is apparent that to a first approximation this output 46 is equal to $u'$, $v'$, $w'$, $x'$, $y'$, etc. This signal passes through a second integrator 44, thereby yielding a signal 47 comprising a series of slant lines, the end of each slant having amplitudes, respectively, of $u'$, $u'+v'$, $u'+v'+w'$, $u'+v'+w'+x'$, $u'+v'+w'+x'+y'$, etc. This signal 47 is, of course, the signal which is subtracted in subtractor 31 from input signal 32 having the amplitudes $a$, $b$, $c$, $d$, $e$, etc., as chosen above. This subtraction yields signal 33 comprising amplitudes $u$, $v$, $w$, $x$, $y$, etc., so that the following relationships are manifest:

$$a-0=u$$
$$b-u'=v$$
$$c-(u'+v')=w$$
$$d-(u'+v'+w')=x$$
$$e-(u'+v'+w'+x')=y, \text{ etc.}$$

It follows readily that:

$$u\cong a\cong u'$$
$$v\cong b-a\cong v'$$
$$w\cong c-b\cong w'$$
$$x\cong d-c\cong x'$$
$$y\cong e-d\cong y', \text{ etc.}$$

For the sake of convenience the term "quantized double differential" will be used to designate the signal 38 that is to be transmitted to a receiving station. It can be seen that this signal represents essentially the quantized difference of two successive differential samples, each of which represents the difference of its corresponding instant input sample and the signal derived by double integration of the previously transmitted output samples. It is to be noted that, with reference to this double differential circuit, the term "differential" represents the difference of a corresponding instant input sample and a signal derived by double integration of the previously transmitted output samples. The result of a double differential operation of this sort is that a signal will be transmitted only when there is a change in the slope of the input signal, so that an input signal which is changing at a constant rate will require zero channel capacity. In accordance with the invention, this signal 38 can, of course, be coded before transmission; and in Fig. 3, there is shown a coder 48 which operates on said signal 38 to produce a coded signal 49 for transmission to the receiving station. At this receiving station, the signal is operated on by decoder 51 and the decoded signal 52 is twice integrated in integrators 53 and 54 to yield a replica 56 of the original input signal 32. Just as has been stated in regard to the elements of Fig. 1, all the several circuits which have been shown in Fig. 3 in block form can, in accordance with the invention, be devices which are well known and in common use in the art.

Figure 5:
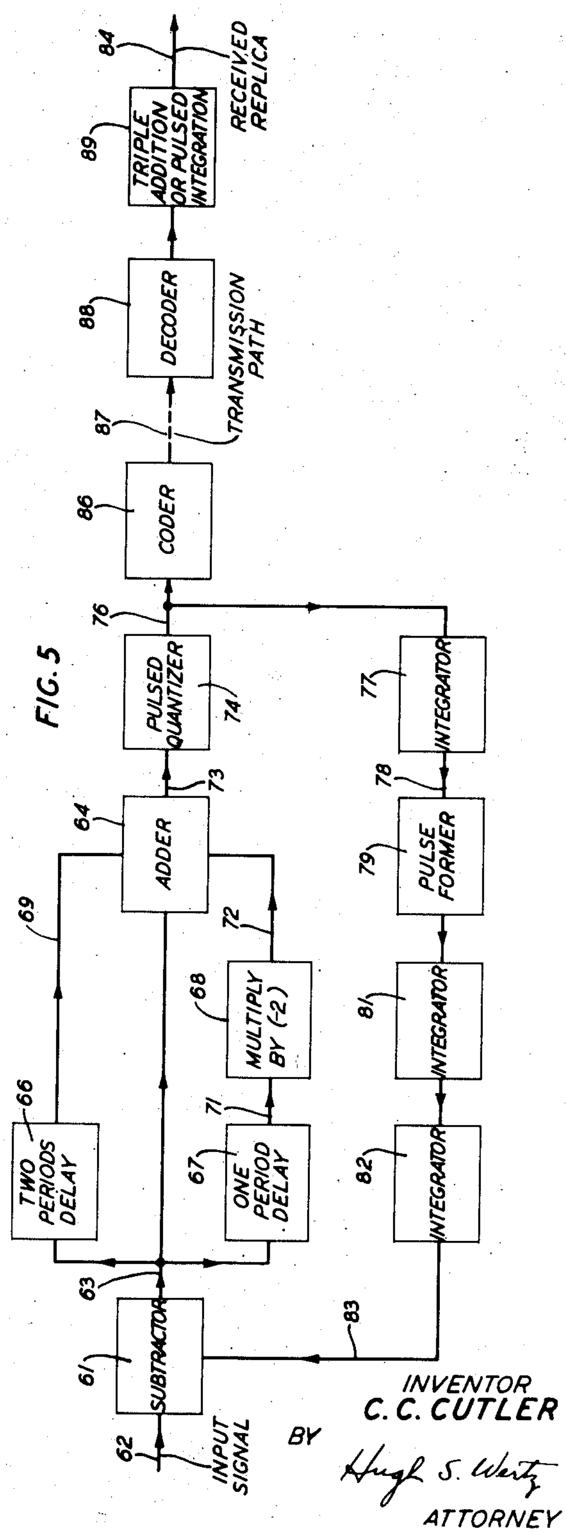
Fig. 5 illustrates an exemplary arrangement of a triple differential quantization transmission system.

Just as double differential quantization can afford enhanced transmission efficiency, still further reductions in channel capacity can be gained by employing additional degrees of differentiation. The arrangement shown in Fig. 3 and described in connection therewith can be extended into a triple differential system by adding additional delaying means and an additional subtractor connected in the same manner as delaying means 34 and subtractor 35 of Fig. 3. This would, in effect, yield a signal which is the quantized difference of two successive signals 36 of that figure. Since such an arrangement is a straightforward extension of the embodiment of the invention which has already been described in connection with Fig. 3, and since in certain examples of practice of the invention a somewhat different system for obtaining triple differential quantization is to be preferred, there is shown in Fig. 5 such a different system. For consistency of exposition, let it again be assumed that the input signal 62 to subtractor 61 of Fig. 5 has at the respective sampling times amplitudes $a$, $b$, $c$, $d$, $e$, $f$, etc., and that the output signal 63 from the subtractor has amplitudes $u$, $v$, $w$, $x$, $y$, $z$, at these times. A portion of this signal 63 is delayed in delaying means 66 by an amount equal to two sampling intervals, while another portion of the signal 63 is delayed in a delaying means 67 by an amount equal to one sampling interval. The signal 69 from delaying means 66 is fed directly to an adding circuit 64, whereas the signal 71 from delaying means 67 is fed to a multiplier circuit 68, where its amplitude is changed by the factor $-2$. The output 72 of the multiplier is also fed to the adder circuit 64, as is an undelayed portion of the subtractor output signal 63. The adder circuit 64 can, of course, be a simple resistance network such as is common in the art for such purposes, and the multiplying circuit 68 can be, for example, an ordinary electronic amplifier whose gain is set at the required amount. By definition, when the signal 63 has the values $v$, $w$, $x$, $y$, $z$, the signal 69 will have the corresponding values $t$, $u$, $v$, $w$, $x$ and the signal 72 will have the values $-2u$, $-2v$, $-2w$, $-2x$, $-2y$. Thus, the output 73 of the adder is at those corresponding times equal to $v+t-2u$, $w+u-2v$, $x+v-2w$, $y+w-2x$, and $z+x-2y$. For simplicity of exposition, it can further be assumed that the subtractor output 63 has zero amplitude at all times prior to that corresponding to $v$, so that $t=u=0$, and the signal 73 has the amplitudes $v$, $w-2v$, $x+y-2w$, $y+w-2x$, and $z+x-2y$. This signal 73 is then fed to a pulsed quantizer 74 which corresponds to the pulsed quantizer 37 of Fig. 3. The output 76 of this pulsed quantizer 74 is a signal which consists of a series of pulses having amplitudes corresponding to the amplitudes of the signal 73. This series of pulses 76 is then fed to an integrator 77, producing an output signal 78 having succeeding amplitudes $v'$, $(w-v)'$, $(x-w)'$, $(y-x)'$, $(z-y)'$, which are at once recognizable as being equivalent to the signal 38 which is the output of the pulsed quantizer 37 of Fig. 3. Thus, additional integration in integrators 81 and 82, which correspond to integrators 39 and 44 of Fig. 3, yields a signal 83 which is equivalent to signal 47 of Fig. 3 and which is in the very like manner subtracted from the original input signal. The signal 78 is, however, unlike the signal 38 of Fig. 3, a step-shaped quantized signal rather than a series of pulses, as is signal 38. Therefore, a pulse former circuit 79 is employed to regenerate the pulse shape and thereby prevent ultimate degradation of the signal. Such a pulse former circuit can be any of several which are in common use in the pulse code modulation art and does nothing more nor less than to pulse the first integrator output before subsequent integration takes place.

Just as in the double differential quantization embodiment of the invention, the output signal which is to be transmitted can be coded for greater efficiency in transmission; and in Fig. 5, there is shown a coder 86 which operates on triple differential signal 76 to yield a coded signal 87. This coded signal is at the receiving point decoded in decoder 88 and then undergoes a series of integrations in integrator circuits 89 to yield a replica 84 of the original input signal 62. It has been observed that the double differential signal 38 of Fig. 3 effectively represents the slope of the quantum level changes and that a signal is transmitted in that embodiment of the invention only when there is a change in the slope. In the triple differential quantization embodiment of the invention which has just been described, the so-called triple differential signal 76 (or its coded counterpart 87) effectively represents the change in the slope of the quantum level changes. In the practice of this embodiment of the invention, therefore, a signal will be transmitted only when there is a change in the change of the slope, and a signal whose slope is changing at a constant rate will require zero channel capacity.

It is evident that in any of the circuits which have been described, an error in the signal transmission is carried over to succeeding samples. In the simple case of differential quantization, such as in the embodiment illustrated in Fig. 1, this effect is equivalent to adding a step function to the original signal. Provided that there is no requirement of transmitting a direct-current value of signal, this results in only a temporary effect. In the case of double differential quantization, such as is performed by the embodiment of the invention which is shown in Fig. 3, the result is that a linearly increasing or decreasing voltage is added to the correct output. Similarly, in those embodiments of the invention in which higher differential signals are formed, a voltage is added which varies as $t^n$, where $t$ is time and $n$ is the order of the differential. In accordance with the invention, any of these voltages can be removed at the receiver by coupling between integrators a large condenser which removes the direct-current level after each integration, thereby eliminating all except certain temporary effects.

It is to be understood that the above-described arrangements are illustrative of the application of the principles of the invention. Numerous other arrangements may be devised by those skilled in the art without departing from the spirit and scope of the invention.

What is claimed is:

1. In a system to produce quantized differential signals, subtracting means supplied with message waves for providing differential signals, a multilevel quantizer characterized by a plural number of quantum levels of each sign supplied with said differential signals for providing quantized differential signals, integrating means supplied with said quantized differential signals for adding algebraically said quantized differential signals, and means for supplying the output of said integrating means to the subtracting means for providing the differential signals.

2. A closed loop circuit having input terminals supplied with a message wave and output terminals for supplying utilization means with a quantized differential signal comprising subtracting means supplied from said input terminals for providing a differential signal, a multilevel quantizer characterized by a plural number of quantum levels of each sign supplied with said differential signals for providing quantized differential signals to said output terminals, means supplied with said quantized differential signals for performing an integrating operation thereon, and means for supplying the output of said integrating means to said subtracting means for deriving the differential signals.

3. In a system to produce quantized differential samples of a message wave, subtracting means supplied with input message waves for providing differential signals, a multilevel quantizer characterized by a plural number of quantum levels of each sign for sampling and quantizing said differential signals for providing quantized differential message samples, integrating means supplied with said quantized differential wave samples, and means for applying the output of said integrating means to the subtracting means for deriving the differential signals therefrom.

4. A system according to the system of claim 3 in which the quantized differential samples are coded for transmission to a receiving station.

5. In a system for the communication of the intelligence of a message wave, a first subtracting means supplied with instant samples of the message wave and signals derived by double integration of the previously transmitted output samples for obtaining differential samples, a second subtracting means for subtracting from each of these differential samples the immediately preceding differential sample for obtaining double differential samples, means for quantizing said double differential samples and providing quantized double differential output samples for transmission, integrating means supplied with said quantized double differential samples for operating thereon and deriving signals for application to the first subtracting means, and means at a receiving station for reconstructing a replica of a message wave from the quantized double differential output samples transmitted.

6. In a system for the communication of the intelligence of a message wave, a subtracting network supplied with instant samples of the message wave and signals derived by triple integration of previously transmitted output samples for obtaining differential samples, means for combining in a predetermined manner each successive differential sample with the two immediately preceding differential samples for obtaining triple differential samples, means for quantizing said triple differential samples and providing quantized triple differential output samples for transmission, means for triple integration of said quantized triple differential output samples for obtaining signals for application to said subtracting network, and means at a receiving station for reconstructing a replica of the message wave from the transmitted quantized triple differential output samples.

CASSIUS C. CUTLER.

REFERENCES CITED

The following references are of record in the file of this patent:

UNITED STATES PATENTS

| Number | Name | Date |
|---|---|---|
| 1,796,030 | Kell | Mar. 10, 1931 |
| 2,202,605 | Schroter | May 28, 1940 |
| 2,449,467 | Goodall | Sept. 14, 1948 |
| 2,510,054 | Alexander et al. | June 6, 1950 |

FOREIGN PATENTS

| Number | Country | Date |
|---|---|---|
| 932,140 | France | Nov. 17, 1947 |